Dec. 29, 1936.  O. KNOERZER  2,066,008
IRRIGATING PIPE
Filed Oct. 8, 1935
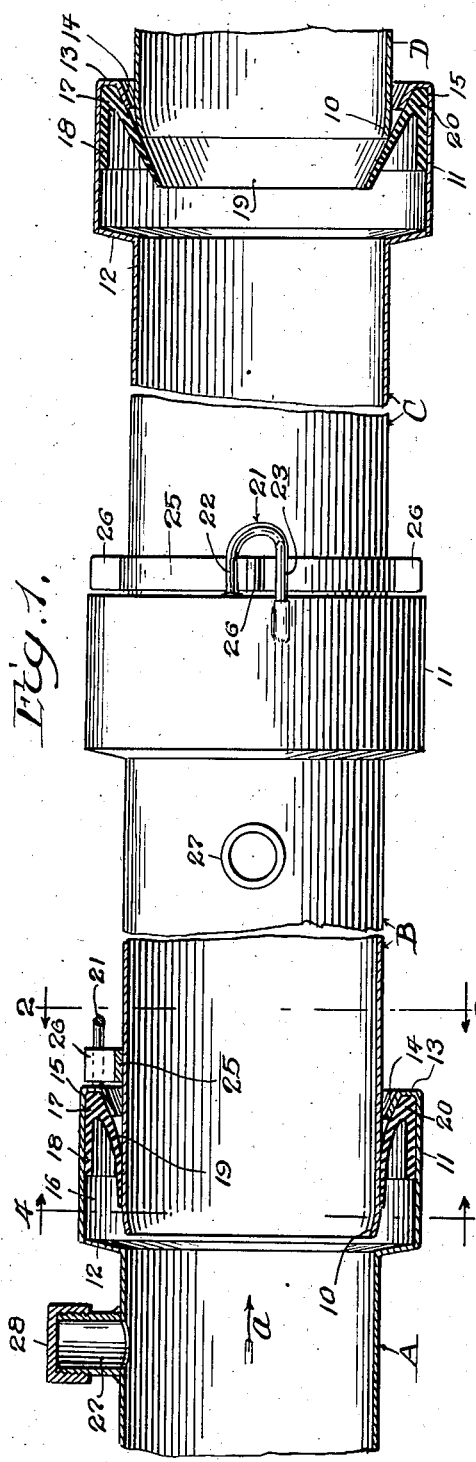
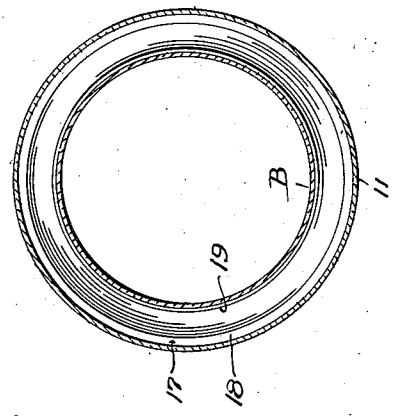
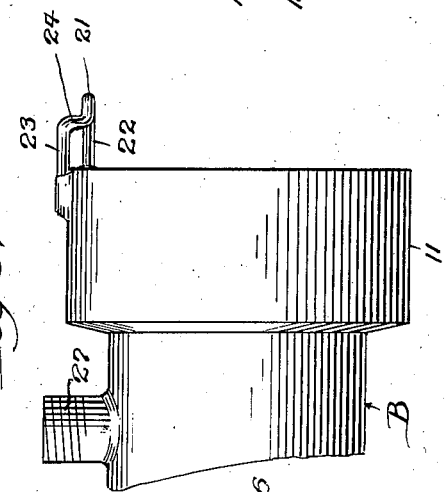
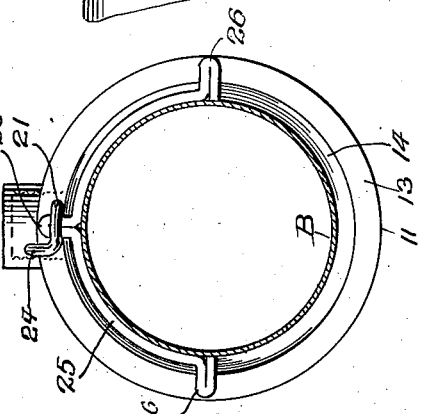
Inventor:
Otto Knoerzer,
by Charles O. Shurvey
his Atty.

Patented Dec. 29, 1936

2,066,008

UNITED STATES PATENT OFFICE 2,066,008

IRRIGATING PIPE

Otto Knoerzer, Hammond, Ind., assignor to Champion Corporation, Hammond, Ind., a corporation of Indiana Application October 8, 1935, Serial No. 44,068

2 Claims. (Cl. 285—175)

This invention relates to irrigating pipes.

One of the objects of the invention is to provide a novel leak-proof joint between adjacent pipes, by means of which the pipes may be connected without the aid of tools or other implements.

Another object is to provide novel locking means between adjacent pipes for preventing disconnection therebetween, said locking means permitting one pipe to be turned within the other to locate an outlet thereof so as to stand in a vertical position or lie in a horizontal position at either side of the pipe.

Other objects and advantages will appear in the course of this specification, and with all of said objects and advantages in view, this invention consists in the several novel features hereinafter fully set forth and claimed.

The invention is clearly illustrated in the drawing accompanying this specification, in which:

Fig. 1 is a view partly in side elevation and partly in central longitudinal section of several irrigating pipes, partly broken away, and illustrating a simple embodiment of the present invention;

Fig. 2 is a vertical cross-section, taken on the line 2—2 of Fig. 1;

Fig. 3 is a fragmental, side elevation of one end portion of one of the pipes; and Fig. 4 is a vertical cross-section, taken on the line 4—4 of Fig. 1.

Referring to said drawing, the reference characters A, B, C, D designate fragments of four lengths of irrigating pipe embodying a simple form of the present invention. The pipes may be made of any desirable lengths and they are shown as broken away between their ends to enable the view to be made as large as possible upon the sheet of drawing. One end of each pipe is slightly tapered, as at 10, and the other end is formed with a bell or flange 11, which is adapted to receive the tapered end of an adjacent pipe. The pipes, including their flanges, are desirably constructed from light gauge sheet metal, and the flanged end is usually formed of a separate piece of sheet metal welded to an out-turned flange 12 on the end of the pipe proper.

The end edge of the bell or flange 11 is turned inwardly, radially, as at 13, and then turned into the hollow of the bell or flange 11, as at 14, to form a tapered lip which provides an annular tapered groove 15 in the interior of the bell.

The bell or flange 11 provides an annular cavity 16, around an adjacent pipe, in which cavity is received a resilient gasket 17, desirably made of rubber. The gasket is somewhat V-shaped or tapered in cross-section, and the apex end thereof is intended to be held in the groove 15. The gasket is formed with two annular diverging lips 18, 19 that extend from a thickened apex portion 20. The lip 18 fits against the internal face of the bell or flange 11, whereas the lip 19 is of tapered or conical form, and when the pipe is not connected to another one, said lip 19 occupies the position indicated in the pipe C. When the tapered end of a pipe is inserted into the bell, it spreads the tapered lip 19 outwardly, as is indicated in the pipe A, the lip 19 hugging the inserted pipe and affording a leak-proof joint. The flow of water through the pipes is in the direction of the arrow, a, in Fig. 1, and the pressure thereof is against the inner or opposing faces of the lips and as a consequence it seats the apex portion in the groove and tightly presses the lips against the internal face of the bell and against the external face of the inserted pipe, thereby eliminating leakage at the joint.

Locking means are provided for preventing accidental disconnection between adjacent pipes. As shown, said means comprises a lock-yoke 21, welded or otherwise rigidly fastened to the bell of each pipe, and a lock segment 25, welded or otherwise rigidly fastened to the tapered end of each pipe in position to engage with the lock-yoke.

The lock-yoke is of U formation, one leg 22 of which is welded to the end edge of the bell, and one leg 23 welded to the cylindrical face of the bell. This brings the leg 23 somewhat higher than the leg 22 (see Fig. 3), but at the place where it joins the U bend of the yoke it is bent down as at 24, the purpose of which will be presently explained.

The lock segment 25 is substantially semicircular, and fits upon the external face of the pipe. At its middle portion and at its ends the lock segment is doubled upon itself to form three legs 26, that are disposed approximately ninety degrees apart.

Each lug is adapted to engage with the lock-yoke 21 and prevents accidental disconnection between adjacent pipes. The upper leg 23 of the yoke permits any lug to enter the yoke. When one pipe is turned within the other and when any lug is engaged with the yoke, the pipes cannot be disconnected by any endwise movement of one relative to the other.

The pipes are joined by inserting the tapered end of one pipe into the bell of the other as far as it will go, and then turning the first mentioned pipe, bringing a lug into the opening in the yoke. The lock segment also serves to limit the distance one pipe can be inserted into the bell, and by pushing the pipe in until the lock segment abuts against the edge of the bell, the attendant knows that proper contact has been made between the gasket and the inserted pipe.

Desirably each pipe is provided with a threaded nipple 27, for connection with a hose, sprinkler pipe or other pipe connection. A screw cap 28 is provided for each nipple. The nipple on each pipe is located in some definite relation to the lock-yoke, and the lock segment is likewise located in a definite relation thereto. Conveniently the nipple and the middle lug on the lock segment are in alignment with the lock-yoke. The purpose of this arrangement is to enable the attendant to couple the pipes in such manner that any nipple may stand upright or extend horizontally in either direction from the pipe. For instance, in Fig. 1, one of the end lugs of pipe B is engaged with the lock-yoke of pipe A, and therefore the nipple assumes a horizontal position. When the middle lug is engaged with the lock-yoke, the nipple stands vertical. When a nipple is connected to a sprinkler pipe it should stand upright, whereas when connected to a hose it is preferable to have the nipple lie horizontally.

A long line of irrigating pipe may be quickly and easily laid from the source of supply to the place or places where it is necessary to furnish water. The form of joint shown, enables the pipes to be laid on uneven ground, because the gasket permits considerable angular adjustment between any two adjacent pipes, and the locking means allows some angular adjustment but prevents disconnection between the pipes.

The tapered lip 14 of the bell facilitates the insertion of the tapered end of an adjacent pipe, besides providing, with the wall of the bell, a groove to hold the gasket.

I claim as new and desire to secure by Letters Patent:

1. Irrigating pipe, comprising lengths of pipe, each having on one end a bell formed of a cylindrical wall terminating at its outer end in an inturned tapered lip, extending into the hollow of the bell and forming with the cylindrical wall an annular groove of tapered cross section, an endwise movable gasket of tapered cross section, loosely and removably held in said annular groove, said gasket having an apex portion and two lips that diverge therefrom, one lip bearing against the cylindrical wall of the bell and the other lip being tapered and extending into the hollow of the bell, the other end of a length of pipe being insertable into the bell of an adjacent pipe with the tapered lip of the gasket hugging the external side thereof, whereby pressure applied in the pipes serves to seat the apex part of the gasket in the annular groove in the bell and to press the lips of the gasket against the cylindrical wall of the bell and the inserted pipe.

2. Irrigating pipe, comprising lengths of pipe having a bell and spigot slip joint connection with each other, there being a lateral outlet leading from one of the pipes, a lock yoke secured to the end of the bell and projecting endwise therefrom, one leg of the lock yoke having an offset part raised above the plane of the remainder of the yoke to provide a lateral entrance thereto, and a lock segment secured on the other end of an adjacent pipe, said lock segment having a plurality of circumferentially disposed lugs thereon, each of which may enter the yoke through the entrance thereto below the offset part thereof, said lug co-operating with the lock yoke to locate the lateral outlet of the pipe in a vertical or horizontal position.

OTTO KNOERZER.